US011120702B2

(12) United States Patent
Douglas et al.

(10) Patent No.: US 11,120,702 B2
(45) Date of Patent: Sep. 14, 2021

(54) SYSTEMS AND METHODS FOR VALIDATING LOCALIZED ASSESSMENTS IN AN EXTERNAL SYSTEM

(71) Applicant: salesforce.com, inc., San Francisco, CA (US)

(72) Inventors: Jeff Douglas, Palmetto, FL (US); Justin Scott Powers, Lake Isabella, CA (US); Joyce Yeh, San Francisco, CA (US); Stephan Cocron, San Francisco, CA (US); Adam Torman, Walnut Creek, CA (US); Douglas Bitting, Pleasanton, CA (US)

(73) Assignee: salesforce.com, inc., San Francisco, CA (US)

( * ) Notice: Subject to any disclaimer, the term of this patent is extended or adjusted under 35 U.S.C. 154(b) by 11 days.

(21) Appl. No.: 16/699,654

(22) Filed: Dec. 1, 2019

(65) Prior Publication Data
US 2021/0166573 A1 Jun. 3, 2021

(51) Int. Cl.
*G06F 3/00* (2006.01)
*G09B 7/00* (2006.01)
*G06F 9/445* (2018.01)
*G06F 9/54* (2006.01)

(52) U.S. Cl.
CPC ........... *G09B 7/00* (2013.01); *G06F 9/44526* (2013.01); *G06F 9/54* (2013.01)

(58) Field of Classification Search
CPC ..... G06F 9/5038; G06F 9/542; G06F 16/2255
USPC ........................................................ 719/310
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

Mark Hills, Navigating the WordPress Plugin Landscape. (Year: 2016).*

(Continued)

*Primary Examiner* — Lechi Truong
(74) *Attorney, Agent, or Firm* — Weaver Austin Villeneuve & Sampson LLP

(57) ABSTRACT

Disclosed are some implementations of systems, apparatus, methods and computer program products for facilitating the validation of assessments in an eLearning environment. Validation is facilitated using an assessment definition that includes one or more application programming interfaces (APIs) and identifies, for each of the APIs, a corresponding plugin and handler. Each of the APIs is configurable to obtain at least one user response to a corresponding challenge task via the corresponding plugin and each handler is configurable to validate the user response returned via the corresponding API. The accuracy of the user response to each challenge task is determined via the corresponding handler identified within the assessment definition. APIs can include a third party API, enabling validation of user responses across different systems. The user's knowledge may be assessed based upon the accuracy of the user's responses to all of the challenge tasks.

17 Claims, 14 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheab |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshavsky et al. |
| 9,628,493 B2 | 4/2017 | Warshavsky et al. |
| 9,647,922 B2 | 5/2017 | Mortimore, Jr. |
| 9,710,127 B2 | 7/2017 | Torman et al. |
| 10,049,131 B2 | 8/2018 | Torman et al. |
| 10,223,136 B2 | 3/2019 | Torman et al. |
| 10,275,281 B2 | 4/2019 | Pradeep et al. |
| 10,296,661 B2 | 5/2019 | Sreenivasa et al. |
| 10,332,129 B2 | 6/2019 | Torman et al. |
| 10,339,126 B2 | 7/2019 | Pradeep et al. |
| 10,380,094 B2 | 8/2019 | Warshavsky et al. |
| 10,394,412 B2 | 8/2019 | Torman et al. |
| 10,523,615 B1* | 12/2019 | Sim ................. H04L 51/10 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |

(56) References Cited

U.S. PATENT DOCUMENTS

| | | |
|---|---|---|
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0146085 A1* | 6/2010 | Van Wie ............... H04L 67/34 709/220 |
| 2011/0087516 A1* | 4/2011 | Frieden ............... G06Q 10/063 705/7.26 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0106736 A1 | 4/2015 | Torman et al. |
| 2015/0142596 A1 | 5/2015 | Jakobson et al. |
| 2015/0172563 A1 | 6/2015 | Jakobson et al. |
| 2015/0317128 A1* | 11/2015 | Baughman ............... G06F 8/20 717/103 |
| 2017/0075922 A1 | 3/2017 | Torman et al. |
| 2018/0025113 A1 | 1/2018 | Torman et al. |
| 2018/0095613 A1 | 4/2018 | Ready et al. |
| 2018/0096012 A1 | 4/2018 | Warshavsky et al. |
| 2018/0096020 A1 | 4/2018 | Sreenivasa et al. |
| 2018/0096024 A1 | 4/2018 | Bitting et al. |
| 2018/0096127 A1 | 4/2018 | Purkiss et al. |
| 2018/0096130 A1 | 4/2018 | Purkiss et al. |
| 2018/0096165 A1 | 4/2018 | Warshavsky et al. |
| 2018/0096613 A1 | 4/2018 | Torman et al. |
| 2019/0155626 A1 | 5/2019 | Torman et al. |

OTHER PUBLICATIONS

Nicholas Jillings, Intelligent audio plugin framework for the Web Audio API. (Year: 2017).*

"Google Plus Users", Google+Ripples, Oct. 31, 2011 [retrieved on Feb. 21, 2012 from Internet at http://www.googleplusers.com/google-ripples.html], 3 pages.

* cited by examiner

Leads & Opportunities for Salesforce Classic > Create a Sales Process and Use Opportunities ▼

YOUR CHALLENGE

── 382

Create an opportunity with yourself on the opportunity team

You've met with your newest account and have identified a new opportunity. Create a new opportunity and add yourself to the opportunity team.

To start with:

- Use the instructions in the unit to enable Opportunity Teams.
- Use the instructions in the unit to add the Opportunity Teams related list to the Opportunity page layout.

- Create an opportunity
- Opportunity Name: 500 units
- Stage: Prospecting
- Choose any Amount, any Close Date in the future, and pick any value for the Account Name
- Add yourself to the opportunity team for the 500 units opportunity
- Team Role: Sales Rep

My Trailhead Playground 1 ▼    Launch

── 384

Check challenge to earn 500 points

── 380

Time Estimate
⏱ About 15 mins

Topics

Learning Objectives
The Sales Process
Opportunities
Opportunity Stages
Contact Roles on Opportunities
Sell as a Team
Resources
─────
| Challenge 500 points ◉ Question, feedback or help

*FIGURE 3C*

```
{
    "apiName": "admin_intro_opptys_leads_opportunities",
    "description": "",
    "requirements": [],
    "checks": [
        {
            "apiName": "find200Units",
            "plugin": "SalesforceRestApi",
            "definition": {
                "endpoint": "query",
                "parameter": "q=SELECT ID from Opportunity Where Name = '&t{opp.name}' LIMIT 1"
            },
            "handler": "find200Units"
        }
    ]
}
{
    "en": {
        "find200Units.found": "'200 units' opportunity was found",
        "find200Units.not.found": "The '200 units' opportunity could not be found, or its stage is not set to 'Prospecting'",
        "opp.name": "200 units",
    },
    "ja": {
        "find200Units.found": "「200 ユニット」商談が見つかりました。",
        "find200Units.not.found": "「200 ユニット」商談が見つかりません。またはフェーズが「プロスペクティング (見込み調査)」に設定されていません。",
        "opp.name": "200 ユニット",
    }
}
```

```
{
  "apiName": "admin_intro_opptys_leads_opportunities",
  "description": "",
  "requirements": [],
  "checks": [
    {
      "apiName": "find200Units",
      "plugin": "SalesforceRestApi",
      "definition": {
        "endpoint": "query",
        "parameter": "q=SELECT ID from Opportunity Where Name = '%t{opp.name}' LIMIT 1"                 532
      },
      "handler": "find200Units"
    }
  ]
}
```

534

```
def find200Units
  if data['totalSize'] == 1
    { 'result' => { 'completed' => true, 'msg' => 'find200Units.found' } }
  else
    { 'result' => { 'completed' => false, 'msg' => 'find200Units.not.found' } }
  end
end
```

*Figure 5B*

```
{
    "apiName": "admin_intro_opptys_leads_opportunities",
    "description": "",
    "requirements": [],
    "checks": [                                                              ⟵ 534
        {
            "apiName": "find200Units",
            "plugin": "SalesforceRestApi",
            "definition": {
                "endpoint": "query",
                "parameter": "q=SELECT ID from Opportunity Where Name = '&t{opp.name}' LIMIT 1"
            },
            "handler": "find200Units"
        }
    ]
},
{                                                                            ⟵ 536
    "en": {
        "find200Units.found": "'200 units' opportunity was found",
        "find200Units.not.found": "The '200 units' opportunity could not be found, or its stage is not set to 'Prospecting'",
        "opp.name": "200 units",
        "salesRep.found": "'Account Manager' for 'Washington Industries' was found and is the current user.",
        "salesRep.not.found": "The 'Sales Rep' Team Role for '200 units' could not be found or it is not set to the current user.",
    },
    "ja": {
        "find200Units.found": "「200 ユニット」商談が見つかりました。",
        "find200Units.not.found": "「200 ユニット」商談が見つかりません。またはフェーズが「プロスペクティング (見込み調査)」に設定されていません。",
        "opp.name": "200 ユニット",
        "salesRep.found": "「Washington Industries」の「アカウントマネージャ」が見つかりました。現在のユーザです。",
        "salesRep.not.found": "「200 ユニット」の「Sales Rep」チーム役割は見つかりませんでした。または、現在のユーザに設定されていません。",
    }
}
```

*Figure 5C*

```
{
    "en": {
        "find200Units.found": "'200 units' opportunity was found",
        "find200Units.not.found": "The '200 units' opportunity could not be found, or its stage is not set to 'Prospecting'",
        "opp.name": "200 units",
        "salesRep.found": "'Account Manager' for 'Washington Industries' was found and is the current user.",
        "salesRep.not.found": "The 'Sales Rep' Team Role for '200 units' could not be found or it is not set to the current user."
    },
    "ja": {
        "find200Units.found": "「200 ユニット」商談が見つかりました。",
        "find200Units.not.found": "「200 ユニット」商談が見つかりません。またはフェーズが「プロスペクティング」(見込み調査)」に設定されていません。",
        "opp.name": "200 ユニット",
        "salesRep.found": "「Washington Industries」の「アカウントマネージャ」が見つかりました。現在のユーザです。",
        "salesRep.not.found": "「200 ユニット」の「Sales Rep」チーム役割は見つかりませんでした。または、現在のユーザに設定されていません。"
    }
}
```

*Figure 5D*

SYSTEMS AND METHODS FOR VALIDATING LOCALIZED ASSESSMENTS IN AN EXTERNAL SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with validating user responses to assessments. More specifically, this patent document discloses techniques for using a central computing system to facilitate validating user responses to hands-on challenge tasks completed across multiple computing systems.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, email systems, and instant messaging systems, by way of example, in a cloud computing environment.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 3C shows an example of a user interface 380 in the form of a GUI presenting educational content as displayed on a computing device, in accordance with some implementations.

FIG. 5A shows an example of localization 500 performed for an API of an assessment definition, in accordance with some implementations.

FIG. 5B shows an example of a handler 530 of an assessment definition, in accordance with some implementations.

FIG. 5C shows an example of localization 550 performed for a handler of an assessment definition, in accordance with some implementations.

FIG. 5D shows example translation tables 580 that may be used to facilitate localization, in accordance with some implementations.

DETAILED DESCRIPTION

Figure 1:
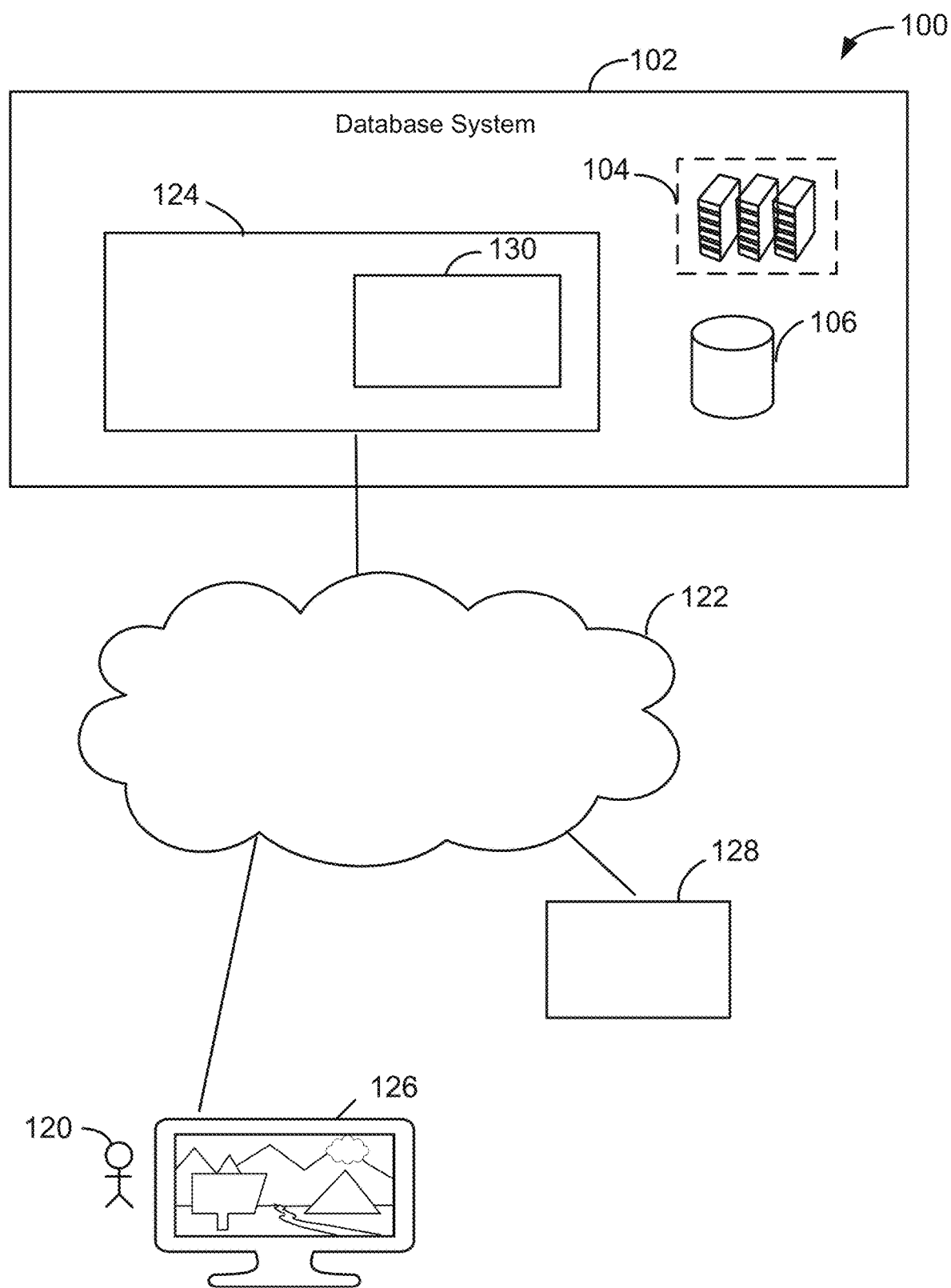
FIG. 1 shows a system diagram of an example of a system 100 in which assessments may be provided and validated in an eLearning environment, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for validating user responses to assessments that provide the user with hands-on assessment tasks that the user is to perform. In some implementations, techniques are disclosed for assessing a user's knowledge based upon responses of the user to an assessment that provides the user with one or more hands-on assessment tasks. The accuracy of the user's responses to the hands-on assessment tasks of the assessment may be validated individually and the aggregated results of the validation for the hands-on assessment tasks of the assessment may be used to assess the user's knowledge. In the following description, hands-on assessment tasks may also be referred to as challenge tasks.

In some implementations, a rubric for validating user responses to an assessment is defined by a corresponding assessment definition. Within the assessment definition, a response of a user to an individual challenge task may be obtained via a corresponding Application Programming Interface (API). Once obtained, the user's response to the challenge task may validated by a corresponding handler that confirms whether the user's response is the correct response for the corresponding challenge task. Specifically, the handler may execute a particular method that evaluates or scores the user's response to the challenge task. Therefore, an assessment definition may be generated using a modular and extensible collection of APIs and their respective handlers.

In some implementations, a database system implements a plugin framework that facilitates integrating APIs of any number of systems. Specifically, when a plugin is called, the plugin calls a corresponding API identified within the assessment definition to obtain user response(s) from a corresponding system. Thus, an API can include a "third party" API that accesses a system that is external to the database system. Alternatively, an API may access an application or service that is internal to or integrated with the database system. In this manner, the database system may provide an assessment platform that validates user responses obtained via third party systems while enabling developers to create an assessment definition by abstracting the complexity of making third party API calls. This enables an author of an assessment and corresponding assessment definition to focus on the curriculum rather than the technology.

In some implementations, an extensible service is provided to connect to external platforms via corresponding APIs to assess a user's responses to challenge tasks. In some implementations, a challenge task may be provided and assessed in an environment of the corresponding external platform. Therefore, a user's responses to challenge task(s) may be obtained via multiple platforms and assessed using a single assessment definition.

In some implementations, a single assessment definition may support localized assessments in any number of locales. For example, a locale may correspond to a country or language. By supporting localization, independent assessment definitions need not be generated for different locales.

In some implementations, an assessment hub provides a modular test harness to use various APIs to provide and validate hands-on assessments in an eLearning context. The assessment hub has an architecture that enables customers, partners, and internal employees of an organization to build assessments, as well as assessment definitions that can be used to access user responses to the assessments from any endpoint of any domain via a corresponding API. The assessment hub can facilitate connections for different types of challenge tasks. These challenge tasks may include hands-on challenge tasks that request that a user complete specific tasks such as programmatic/technical, simulations, peer review, etc. In addition, challenge tasks may include more traditional assessment tasks such as multiple choice questions, mix and match, and fill in the blank. The assessment definition can provide an extensible service to connect to various platforms in order to assess hands-on actions of the user in the environments of the respective platforms. The assessment hub can also be configured to validate hands-on work completed for corresponding challenge tasks using an assessment definition to assess skills competencies. For example, an assessment definition may assess skills competencies for a particular employee role, job title, or subject.

In some implementations, an assessment management unit provides an architecture to facilitate association of different environment identities with an end user. An environment can be a development environment or non-production environment. Typically, assessments will be provided within a non-production environment. The management unit can provide both an identity to log onto the platform with and a mechanism for authorizing use for directly logging into and checking against an environment for hands-on assessments. By securely storing a refresh access token for a given environment, the user can be automatically authenticated into the environment. Authentication may be performed automatically or in response to a user selection of the environment through a declarative interface. Once authorized, an access token may be obtained, and progress can be continually validated using the assessment hub. A user can leverage his or her environments to assess skills learned via an eLearning platform.

In some implementations, an assessment includes multiple hands-on challenge tasks that are provided via multiple systems or non-production environments. The assessment hub may connect to the systems/non-production environments to provide the assessment and validate a user's responses to the assessment. The assessment hub may connect to each system/non-production environment automatically without requiring the user to log in to the system/environment. In some implementations, the assessment hub may access user credentials or a refresh token to automatically authenticate the user for a given system or non-production environment.

In some implementations, an end user can access an assessment of the assessment hub to build solutions for the corresponding challenge tasks in different environments. Completion activity can be tracked and assessed using the same primary eLearning user account.

Typically, a user's knowledge is assessed independently for each individual challenge task that the user completes. However, this capability has been limited to assessing knowledge within a single assessment environment and is generally hard-coded for the assessment environment. An assessment environment is a non-production environment, which may have an associated database that reflects the data records that an employee of the organization would typically encounter during their day-to-day tasks. The user must typically log in to the assessment environment using his or her credentials. If the user would like to assess his or her skills within another assessment environment or within the context of another platform, the user must typically log out of the previous assessment environment and log in to the desired assessment environment or platform. Moreover, there has not been a way for a user's knowledge and skills to be assessed across multiple platforms.

Moreover, historically, credentials or industry-wide certifications have traditionally involved a user sitting at a computer that is monitored and completing a series of multiple choice quizzes. However, multiple choice quizzes have limited value in assessing a user's knowledge and skills in a real-world environment or simulation thereof.

In accordance with various implementations, an assessment may be provided to facilitate user certification in a particular industry in a manner that is more demonstrative of the skills typically required for that industry. A user may complete an assessment including multiple hands-on challenge tasks across any number of challenge types and platforms. By using assessment definitions to validate user responses to the hands-on challenge tasks, this skill set can be verified from any location at any time using learning resources provided by any number of platforms, enabling certification or credentialing of a user.

In accordance with various implementations, by using APIs to obtain and assess a user's responses to hands-on challenge tasks, it is possible to assess a user's knowledge based upon tasks performed within independent system(s) that may be external to the system executing the assessment. For each of the APIs, a corresponding handler may be executed to determine whether a user's response to a challenge task is accurate. Through the use of APIs including third party APIs, it is possible to validate a user's responses to multiple hands-on challenge tasks across multiple systems to assess a user's knowledge. Therefore, APIs offer flexibility that is not present in current systems.

By way of illustration, John is an employee at an organization, Diamond Financial Services, Inc. John accesses an eLearning platform, which enables employees of the organization to complete learning assessments by performing hands-on challenge tasks within the context of their organization and/or within the context other platforms. John logs in to his account and selects a skills assessment from a menu via an assessment hub. During execution of the assessment, a sequence of challenge tasks is presented to John within the context of corresponding platforms or non-production assessment environments.

Diamond Financial Services, Inc. has not integrated its Accounting System with its Information Technology system. A first challenge task requests that John create an Account database record having a name "Acme account" that has three contacts. A second challenge task requests that John complete a case report for a client "Universal Containers" that indicates that Universal Containers is unable to access its online account. The first challenge task may be provided via an Accounting assessment environment or system, while the second challenge task may be provided via an Information Technology assessment environment or system. As John completes the challenge tasks within corresponding assessment environments, John's responses are stored by the corresponding Accounting and Information Technology systems providing the assessment environments. This results in the updating of database records of the corresponding assessment environments/systems.

The system retrieves and uses assessment definition(s) to assess John's knowledge based upon the accuracy of John's responses to the challenge tasks. Specifically, the system uses APIs identified within the assessment definition to retrieve John's responses to the challenge tasks and calls handlers identified within the assessment definition to determine whether John's responses to the challenge tasks are correct. In this example, the system uses a first API to retrieve the Acme account database record and a corresponding handler to verify that the Acme account database record has been retrieved, a second API to retrieve the contacts for the Account ID corresponding to the Acme account database record and a corresponding handler to verify that the database record has three contacts, and a third API to retrieve the case report for the client Universal Containers and a corresponding handler to verify that the case report for the client Universal Containers has been created. The system then assesses John's knowledge based upon the accuracy of John's responses to all of the challenge tasks. In this manner, the system may track the progress of John across any number of platforms including third party platforms using a single eLearning account without requiring John to navigate among different platforms FIG. 1 shows a system diagram of an example of a system 100 in which assessments may be provided and validated in an eLearning environment, in accordance with some implementations. Database system 102 associated with an organization includes a variety of different hardware and/or software components that are in communication with each other. In the non-limiting example of FIG. 1, database system 102 includes any number of computing devices such as servers 104. Servers 104 are in communication with one or more storage mediums 106 configured to store and maintain relevant metadata used to perform some of the techniques disclosed herein, as well as to store and maintain relevant data and/or metadata generated by the techniques disclosed herein. Storage mediums 106 may further store computer-readable instructions configured to perform some of the techniques described herein. In some implementations, storage mediums 106 can store files including assessment definitions, APIs, handlers, and/or other objects such as those described in, which may be accessed as described in further detail below.

In some implementations, database system 102 is configured to store user profiles associated with users (and corresponding user accounts) of database system 102. Information maintained in a user profile of a user can include or indicate one or more of the following: preferences of the user, a role of the user within an organization of users of the database system, a community or group to which the user belongs, permissions that indicate levels of access associated with database records, and/or permissions that indicate authorization privileges assigned to the user, as described herein.

In some implementations, database system 102 is also configured to store privilege information indicating authorization privileges of one or more users as described herein. More particularly, the privilege information may identify, specify, or otherwise indicate access rights and restrictions of users according to various user attributes such as a specified user ID, type of user, role of a user, job title of a user, a group or community to which the user belongs, and/or a particular organization on behalf of which a community is maintained. Each of the communities may be operated on behalf of an organization. Each organization may have associated therewith one or more tenants, which may each be associated with one or more communities. Various access rights and restrictions may control the ability to generate, delete, and/or edit database records or files such as assessment definition files, handlers, and/or APIs. Client device 126 may be in communication with the data provider via network 122. More particularly, a web browser of client device 126 may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which network 122, servers 104, and possible additional apparatus and systems such as multi-tenant databases may all be considered part of the "cloud." Servers 104 may be associated with a network domain, such as www.salesforce.com and may be controlled by a data provider associated with the network domain. A user of client computing device 126 can have an account at salesforce.com®. By logging into this account, the user can access the various services provided by servers 104.

Database system 102 includes an enterprise learning platform 124 that enables users to complete assessments, as described herein. In accordance with various implementations, users may access enterprise learning platform 124 via a client device 126 to complete hands-on challenge tasks associated with assessments. Challenge tasks may be performed within the context of one or more organizations and/or non-production assessment environments provided by an organization. Organizations can include an organization associated with database system 102 and/or another organization/platform associated with an e-learning system that is external to and independent from database system 102. Each organization may have any number of employees. Challenge tasks may include, for example, writing a segment of computer code, filling in a field of a web page with data, modifying data within a data record, or generating a new data record.

In some implementations, an assessment can also include multiple choice questions. Thus, an assessment may include challenge tasks and multiple choice questions that result in user responses. Any user response may be obtained via an API (e.g., third party API) corresponding to the challenge task, question, or associated response, and the user response may be validated or graded against a programmatic rubric using a corresponding handler.

In some implementations, an organization, assessment environment, or platform may have an associated database that replicates data maintained by the organization or platform, as well as the hierarchical structure of the data maintained by the organization or platform. For example, data associated with an insurance company may include customer data, account data, and insurance plan data. A platform or assessment environment may be internal to the database system 102 or external to the database system 102.

In some implementations, the challenge tasks for a particular assessment are presented in the form of learning paths within the context of a game. Learning paths may be organized in chronological order in which they are to be completed by users. Upon successful completion of a challenge task, the user may be presented a corresponding message via a display of their device. In addition, the user may be awarded points or a badge that signify the successful completion of the corresponding learning path.

Users 120 can include different users corresponding to a variety of roles and/or permissions. Examples of users include business users, technical users, content generator users, and learning users. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

Communication among components of database system 102 may be facilitated through a combination of networks and interfaces. Database system 100 may handle and process requests from users 120 of database system 102. For example, content validators and release managers can create or make changes to educational content and have those changes stored in content database 106 or a separate production database. Educational content can include, for example, articles, assessment definitions, challenge task definitions, and/or APIs via which educational content can be accessed.

In some implementations, a user may submit an assessment request to access, view, execute, edit, generate, or delete an assessment. Such a request may be submitted via a menu or other suitable user interface. For example, the user interface may be provided via a web page presented by database system 102.

In some implementations, a user may view available assessment definitions, APIs and/or handlers via a menu or other suitable user interface. A developer may edit or generate an assessment by creating or updating an assessment definition using the available APIs and/or handlers. A user may edit or generate an assessment definition by copying computer-readable code corresponding to handlers and/or APIs into an assessment definition, which is stored as a computer-readable file. This may be accomplished using a word processing tool or via an assessment editor that enables users to select the desired handlers and/or APIs for inclusion in an assessment definition. A file can include one or more assessment definitions.

An assessment definition may identify a plurality of APIs and corresponding handlers configured to validate user responses to challenge tasks. Each handler may be accessed via a corresponding handler API. In some implementations, an API may use a corresponding plugin to access user responses to challenge tasks provided by an external computing system 128, while the corresponding handler may validate the user responses. As shown in FIG. 1, external computing system 128 may be a third party system that is external to database system 102. Communications between database system 102 and external computing system 128 may be transmitted over network 122.

In some implementations, an authorization service may be used to determine who can generate, edit, execute, view, or otherwise access assessment definitions. Multiple modes of access to assessment definitions can exist, which can be based on private authorization or public authorization. In some implementations, the ability to execute or view assessment definitions can be restricted to an appropriate set of users. Similarly, the ability to generate or edit assessment definitions can be restricted. The ability to generate, edit, view, or otherwise access assessment definitions may be supported by one or more APIs.

In some implementations, database system 102 enables a user such as a creator of an assessment definition to establish who can generate, edit, execute, view, or otherwise access assessment definition(s). For example, the user may create a set of rules that governs who can generate, edit, execute, view, or otherwise access assessment definition(s). As another example, the user may specifically identify or otherwise indicate a particular set of users permitted to generate, edit, execute, view, or otherwise access assessment definition(s). In some implementations, an authorization service can be used to determine who can establish or modify the set of rules or set of users, as well as who can establish or modify the permitted levels of access for each set of rules or set of users.

In some implementations, a user of enterprise learning platform 124 may have a single authorization identity. In other implementations, a user of enterprise learning platform 124 may have two or more different authorization identities. This can allow multiple modes of access to educational content including assessments, challenge tasks of an assessment, or assessment definitions, which can be based on private authorization or public authorization. For example, one authorization identity can be a set of access credentials based on a profile of a customer relationship management (CRM) computing platform. As another example, another authorization identity can be a set of access credentials associated with a corresponding learning platform, such as enterprise learning platform 124 or another learning platform associated with external computing system 128. In some implementations, enterprise learning platform 124 can query the set of access credentials from the CRM computing platform and map those credentials and/or permissions with credentials associated with enterprise learning platform 124 or another learning platform. Through the use of one or more sets of access credentials, challenge tasks may be provided and validated across any number of platforms.

In some implementations, an assessment engine platform 130 manages assessments for enterprise learning platform 124. An example of an assessment platform 130 will be described in further detail below with reference to FIG. 2.

Figure 2:
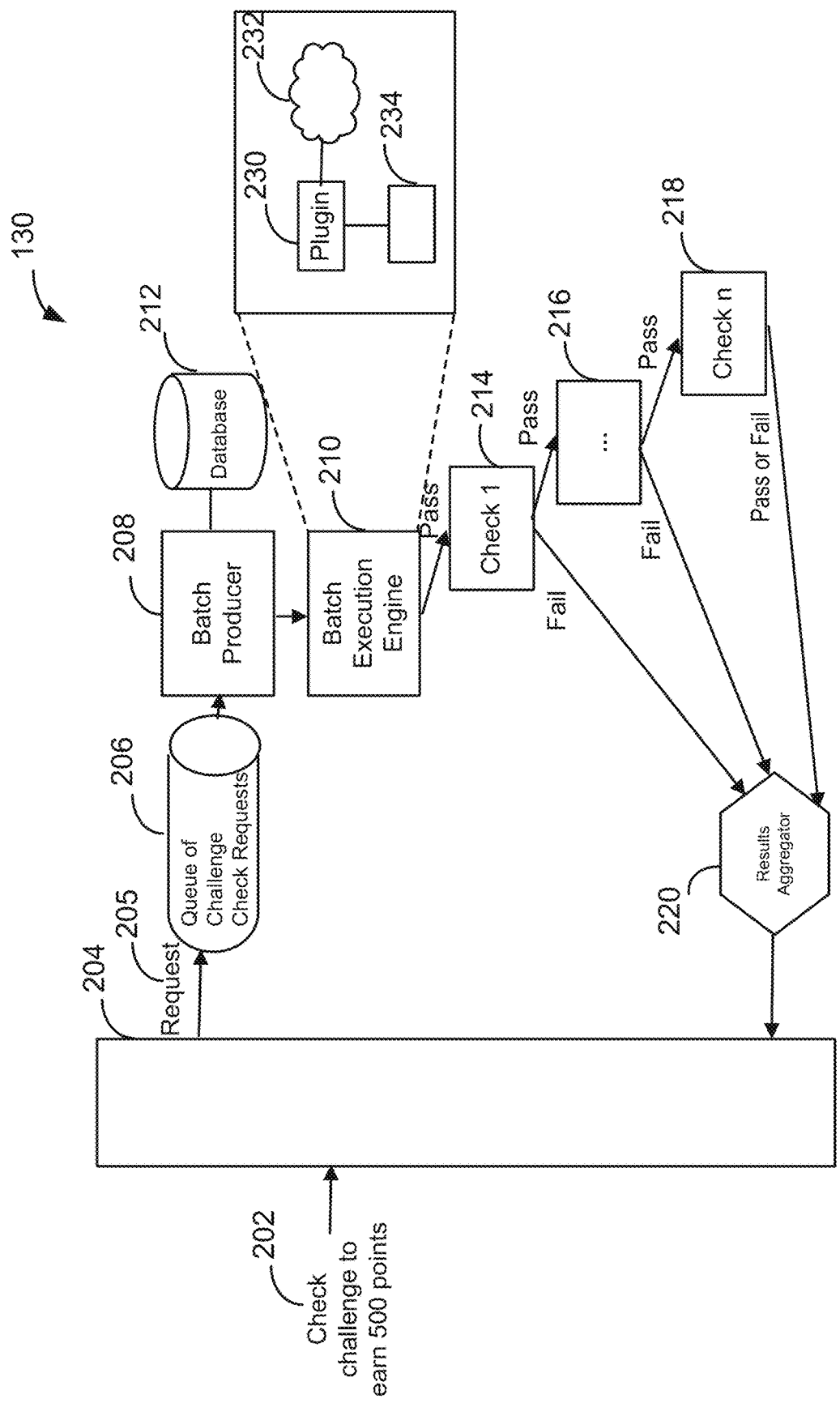
FIG. 2 shows a system diagram of an example of an assessment engine platform 130 for assessment validation in an eLearning environment, in accordance with some implementations.

FIG. 2 shows a system diagram of an example of an assessment engine platform 130 for assessment validation in an eLearning environment, in accordance with some implementations. After a user completes a challenge task, the user may interact with a user interface object such as a button, menu, or tab. In this example, the user clicks a Challenge button 202 to indicate that the challenge task has been completed. In other implementations, the user may interact with a user interface object to indicate that an assessment including a sequence of challenge tasks has been completed.

Database system 102 receives an indication that the user has completed a challenge task or assessment via network 204, and a request 205 including a request identifier may be transmitted to assessment engine platform 130. The request 205 may include information that identifies the challenge task, an assessment including the challenge task, or a corresponding assessment definition. For example, the information may include an identifier that identifies the challenge task or a corresponding assessment definition. The information may also include credentials associated with the user. The credentials may be associated with a particular non-production assessment environment or system that may be accessed, as described in further detail below. In some implementations, the information also indicates a locale of the user. For example, the locale may include a country in which the user resides or a language of the user.

In some implementations, the request 205 may include a challenge check request, which requests that the assessment engine validate the user's response(s) to the corresponding challenge task(s). Assessment engine platform 130 may add this request to Queue of Check Challenge Requests 206, which enables users to complete assessments and user responses to assessments to be validated asynchronously. A Batch Producer 208 may then generate a batch to be processed via Batch Execution Engine 210.

Batch Producer 208 may access database 212 to access the assessment definition(s) corresponding to the challenge task or assessment including a sequence of challenge tasks. Each assessment definition may be identified by a globally unique assessment identifier (ID). Batch Producer may retrieve the assessment definition from database 212 using the assessment ID. As will be described in further detail below, the assessment definition may provide for one or more "checks." Each check may validate a corresponding user response to a challenge task completed by the user. Since completion of a challenge task may result in one or more responses, the assessment definition may provide for a check for each of these responses.

Batch Execution Engine 210 may process each check provided in the assessment definition. In some implementations, failure to validate any of the responses for a challenge task results in failure to validate the entire challenge task. In this example, Batch Execution Engine 210 may perform three checks 214, 216, 218 to validate three responses for a corresponding challenge task. In the event that a check validating one of the responses fails, Batch Execution Engine 210 may determine that the user has failed the challenge task and discontinue applying any remaining checks.

Results Aggregator 220 aggregates the results of checks 214, 216, 218 and may provide results of validation for Request 205 for presentation to the user. Results may be provided automatically or in response to polling by a client device or another system component.

In some implementations, Batch Execution Engine 210 uses an API of Plugin 230 to obtain a user response from corresponding system 232 and a corresponding handler to assess the user response. More particularly, Batch Execution Engine 210 may transmit a query to system 232 via the Plugin API (e.g., third party API) to retrieve the user response from system 232. In addition, Batch Execution Engine may provide the credentials received in Request 205 via the API. Credentials may include a username and password associated with the corresponding system or assessment environment. In some implementations, the credentials may include a refresh access token after an initial login has been completed using one or more authorization mechanisms. After the response has been retrieved from system 232, a handler corresponding to the API may be called to validate the response.

In some implementations, Plugin 230 may apply a handler to determine whether the user response is correct. In this example, Plugin 230 provides the retrieved user response and the handler to service 234, which may include one or more servers that are external to the database system. Service 234 may perform a "check" by executing the handler to validate the response.

While a single Plugin 230 is illustrated in this example, multiple plugins may be implemented to access user responses from corresponding computing systems. Each plugin may be associated with a service provided by database system 102 or a third party entity (e.g., another organization, computing system, or web site). Since multiple responses corresponding to one or more challenge task(s) may be retrieved using one or more plugins, the responses for a single challenge task or assessment may be retrieved via one or more systems including database system 102 and/or a third party system.

In this example, responses corresponding to a single challenge task are validated. However, this example is merely illustrative and responses corresponding to a sequence of challenge tasks may be validated in a similar manner. In some implementations, the results aggregator may determine the number of these challenge tasks that have been accurately completed. A user may pass or fail the corresponding assessment based upon the number of challenge tasks that have been successfully completed or responses that have been successfully validated.

Figure 3B:
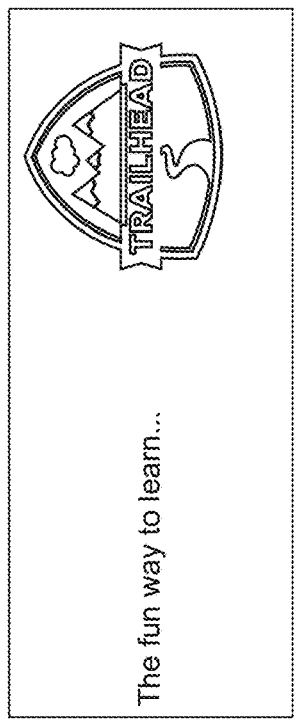
FIG. 3B shows an example of an updated user interface 300b in the form of a GUI as displayed on a computing device presenting assessments, in accordance with some implementations.
Figure 3A:
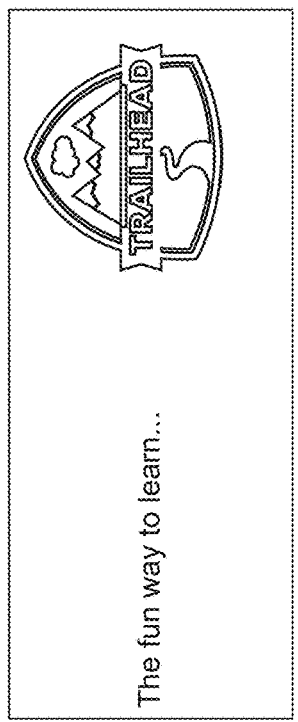
FIG. 3A shows an example of a user interface 300a in the form of a graphical user interface (GUI) presenting components for accessing eLearning assessments in an eLearning environment, in accordance with some implementations.

FIG. 3A shows an example of a user interface 300a in the form of a graphical user interface (GUI) presenting components for accessing eLearning assessments in an eLearning environment, in accordance with some implementations. User interface 300a shows educational content objects 304a-

304f representing corresponding assessments. A user may select an assessment by clicking on the corresponding content object.

In this example, a new assessment configured to assess a user's Accounting skills is generated. The new assessment is configured to provide an assessment including a sequence of challenge tasks that together may be used to assess a user's Accounting knowledge. The assessment may be added to the available user-selectable assessments stored in a repository of assessments. In addition, an updated user interface may include a content object representing the newly generated Accounting assessment.

In addition, an assessment definition configured to assess a user's responses to the new assessment is generated by a developer. The assessment definition may be added to a repository of assessment definitions, which may be maintained in one or more libraries. An example assessment definition will be described in further detail below.

FIG. 3B shows an example of an updated user interface 300b in the form of a GUI as displayed on a computing device presenting assessments, in accordance with some implementations. User interface 300b shows user-selectable educational content objects after the addition of an additional content object representing the newly generated Accounting assessment. In this example, a new content object 308, e.g., "Accounting Intermediate," represents the Accounting assessment. To access an assessment, the user may select one of the content objects from within the user interface. For example, the user may select content object 308 to access the Accounting assessment.

After the user selects the Accounting assessment, the user is then presented one or more challenge tasks. FIG. 3C shows an example of a user interface 380 in the form of a GUI presenting educational content as displayed on a computing device, in accordance with some implementations. As shown in this example, a web page rendered by Database System 102 provides a challenge task 382 to be performed by a user. By providing a challenge task, challenge task "requirements" are provided for completion by a learner. These requirements may include a set of directions that the learner is to perform and be evaluated against. As shown in FIG. 3C, Challenge task 382 requests the user to create an Opportunity with the name "500 units." After the user completes challenge task 382, a corresponding Opportunity record is generated and stored in a database. In this example, the user completes challenge task 382 in a third party non-production testing environment. The user response(s) to the challenge task may result in corresponding values being stored or updated in a database.

After the user completes a particular challenge task or assessment including multiple challenge tasks, the user may click on "Check Challenge" interface object 384 of the GUI. The system may then verify whether the challenge task(s) was successfully completed. For example, where the assessment task resulted in the generation or modification of database records, the system may verify that data and/or metadata associated with the database records has been updated correctly in accordance with the completed challenge task. The result of validation of the assessment task may be presented to the user, who may continue completing further challenge tasks or assessments.

Each challenge task may result in one or more user responses. In accordance with various implementations, an assessment definition may be used by the assessment engine to validate the user responses for one or more challenge tasks completed by the user. For example, an assessment definition may be used to validate the user responses for a single challenge task or an assessment including a sequence of challenge tasks.

Figure 4:
FIG. 4 shows an example of an assessment definition 480 for validating user responses to an assessment, in accordance with some implementations.

FIG. 4 shows an example of an assessment definition for validating user responses to an assessment, in accordance with some implementations. An assessment definition may include computer-readable code or non code declarative configurations, as described herein. In this example, an assessment definition includes JavaScript Object Notation (JSON) code.

The assessment definition may serve as a guideline for an assessment engine to obtain and validate user responses to a single assessment task or a sequence of challenge tasks. In some implementations, the assessment definition may be executed by the assessment engine. In other implementations, the assessment definition is not compiled, but merely used to define the validation rules to be used by the assessment engine.

As shown in FIG. 4, an assessment definition may include one or more "checks" that each validates a user response corresponding to a challenge task. More particularly, an assessment definition may include, for each "check," an API name, a plugin identifier that identifies a plugin API, and a definition for the API (e.g., API name). The definition for the API may define one or more parameters of the API. More particularly, the definition defines the type of parameters expected by the plugin, as well as any parameter values or rules/variables that may be used to obtain parameter values during runtime for the API. For example, as shown in FIG. 4, the plugin "SalesforceRestApi" expects two parameters: an indication that the API expects an endpoint that is a query and a parameter that includes the specific query. As shown in this example, the parameters expected by the plugin "SalesforceRestApi" include a query that varies with the checks that correspond to the different API names. For example, the query for the API "accountExists" queries to determine an ID for an account having a specific account name. As another example, the query for the API "numOfContacts" queries to determine an ID for a contact having a specific account ID (e.g., such as that returned via the "accountExists" API). The results of a query may indicate whether a user has entered the correct information during a challenge task (e.g., whether the user entered the specific contact name or account name via a platform such as a third party platform during completion of a challenge task). As will be described in further detail below, a handler may use the results of a query to determine whether the user's response submitted via a third party platform is valid.

As shown in this example, a plugin may be used for multiple APIs. For example, the plugin "SalesforcerestApi" can be used by the "accountExists" API and the "numOfContacts" API. Therefore, while a plugin may be used for more than one check, the parameter values will vary across the different checks.

Each plugin may correspond to a particular organization, platform, service, and/or web site. For example, a first plugin may correspond to Salesforce, while a second plugin may correspond to Heroku. Therefore, any given plugin may correspond to a computing system such as database system 102 or an external system (e.g., third party service) external to database system 102.

As described above, an API of an assessment definition may be configured to query a corresponding computing system for the response of the user or a particular response requested from the user in the corresponding challenge task. For example, an API may query a computing system for an Opportunity database record having the name "200 units."

Each check also has a corresponding handler that is called to validate the user response to the challenge task. More particularly, the handler executes a particular method that evaluates or scores the user's response to the challenge task. For example, the handler may determine whether the API returned or was able to retrieve an Opportunity database record having a name "200 units" from the corresponding system. As shown in this example, the handler may be called via a corresponding handler API. Since the handler is called via an API, the handler may be stored in a database accessible by database system 102 or may be stored by an external system such that the handler cannot be directly accessed by database system 102.

As described above, each check may correspond to the validation of a single user response. Each check uses a corresponding plugin to obtain a user's response to a corresponding challenge task and a handler to validate the user response.

In some implementations, a check may enable more than one user response to be obtained and validated. For example, a check corresponding to a challenge task may obtain two responses for the challenge task (e.g., Account name and number of contacts). In addition, a plugin may be used to obtain one or more user responses to a challenge task, while a handler may validate one or more user responses for a given challenge task.

In this example, the user has been provided a challenge task to create an account having a specific name and that includes a particular number of contacts. After the user completes the challenge task, the user's response(s) may be stored in a file or database for subsequent validation. After the user the user clicks on the "Check Challenge" button, the assessment engine may use assessment definition(s) corresponding to the challenge task to verify the user's responses for the challenge task.

A single assessment definition may include one or more checks, where each check uses a corresponding plugin. The plugins used by the checks for a single challenge or sequence of challenges need not be the same. For example, a first one of the checks may use a first plugin while a second one of the checks may use a second plugin different from the first plugin. In this example, the assessment definition "api_basics" includes three checks.

In this example, the assessment definition provides for three checks corresponding to the three different responses or aspects of a response being validated for a single challenge task. The first check verifies that the user created the requested account. More particularly, the first check corresponds to a first API "accountExists" that is used to obtain a first user response via a corresponding plugin "Slack," and a corresponding handler "accountExists" is called to validate the user's response by determining whether the requested account exists. The second check calls a second API "numOfContacts" to obtain a second user response via a corresponding plugin "SalesforceRestApi" and a corresponding handler "numOfContacts" is called to validate the user's response by verifying that the user has created the requested number of contacts for the account. The third check calls a third API "accountLabeledCorrectly" to obtain a third user response via a corresponding plugin "Salesforcemdapi" and a corresponding handler "accountlabeledCorrectly" is called to verify that the account name is correct. Therefore, in this example, three different plugins are used to validate a user's responses for a single challenge task.

Typically, software modules that evaluate responses for the challenge tasks are hard-coded to provide challenge tasks in a default language such as English. For example, a challenge task may ask the user to create an Opportunity database record with the name "200 units". However, users that speak other languages such as French or German may also wish to complete the challenge task in their native language and have their responses evaluated in an equivalent manner with the default language submissions. This often means that an assessment creator will spend additional time creating, for each language supported, a duplicate assessment and module(s) for evaluating user response submissions to the assessment.

Unfortunately, it would be extremely time-consuming and cumbersome for developers to generate hard-coded modules to assess the user's answers in every possible language. Moreover, to update a scoring rubric, the developers would then need to update all of these different modules to make scoring consistent across multiple languages. This increases the risk that evaluation of user responses in a language other than the default language will change the meaning of the assessment even if the knowledge that is the basis of the evaluation hasn't changed. In other words, duplicating evaluations by language can inadvertently invalidate the scoring rubric for that release in a non-default language. Therefore, hard-coding modules to support the evaluation of user responses in multiple languages can inadvertently result in invalidating the assessment.

In accordance with various implementations, localization may be performed to assess user's responses within different locales. This may be accomplished by representing a tokenized parameter value of a plugin API (e.g., third party API) as a variable or string that can be translated according to a user's locale. During runtime, the tokenized parameter value may be "translated" or mapped using a translation table, as described in further detail below.

FIG. 5A shows an example of localization 500 performed for an API of an assessment definition, in accordance with some implementations. Rather than hard-coding the desired user response "200 units," the desired user response may be "tokenized" as a variable or string for translation. In this example, the opportunity name is represented by a tokenized string '% t{opp.name}' as shown at 502. During runtime, the tokenized string may be "translated" by Assessment Engine 130 using a locale translation table prior to calling the API. In this example, the user's locale indicates that the user speaks English. Therefore, the English translation table 504 is used to locate the tokenized string for "opp.name" at 506 which is mapped to the string "200 units." As another example, if the user's locale indicates that the user speaks a different language such as Japanese, the tokenized string for "opp.name" at 506 would be mapped to the string of "単位 200" at run time.

To validate the user's response, the API queries the corresponding system for the user's response. In this example, the API may query the system for the opportunity named "200 units." For example, the query may be represented by "q=SELECT ID from Opportunity where Name=% t{opp.name}." A handler may then be called to determine whether the user's response is correct. For example, the handler may determine whether the opportunity named "200 units" was found in the system database (e.g., whether a corresponding ID was found). In this manner, it is possible to localize the scoring rubric in any number of different languages.

FIG. 5B shows an example of a handler 530 of an assessment definition, in accordance with some implementations. Handler "find200Units" is identified in the assessment definition at 532 and a corresponding handler module is represented at 534.

In some implementations, a handler includes computer-readable code that is executed to validate a user response to a challenge task. The handler may be stored in a database accessible by database system 102. In other implementations, the handler is stored by an external system.

As shown in this example, the handler applies a set of rules to determine whether the user response is correct. The set of rules can apply one or more values corresponding one or more variables. For example, a parameter may correspond to a response of the user that has been obtained from the system.

In some implementations, the handler validates the user response obtained via the API. This may be accomplished by determining whether the query to the system was "successful". For example, the handler may determine whether a data item was returned as a result of the query. The handler may return a value or message indicating whether the data item was found in the database.

In some implementations, the handler returns an answer that indicates whether the user response is correct. For example, the handler may return a Boolean value.

In some implementations, the handler returns a localized result. FIG. 5C shows an example of localization 550 performed for a handler of an assessment definition, in accordance with some implementations. Through localization, a response returned by a handler during runtime may be localized using a variable or tokenized string, which may be translated using a translation table 536 according to the locale and returned. For example, a string or variable "find200Units.found," "find200Units.not.found," "salesRep.found," or "salesRep.not.found" may be identified in the translation table 536 and the corresponding string to which the variable is mapped may be returned by the handler. Such a message may be stored in a log file or provided for presentation by a client device of the user.

Through the use of an assessment definition that implements localization, a value being used in a scoring rubric may be translated during runtime. In this manner, it is possible to evaluate the user's responses to an online challenge task or assessment including a sequence of challenge tasks in the user's native language, enabling the user's responses to be accurately assessed.

In some implementations, a value used in a scoring rubric may be translated during runtime using a translation table. FIG. 5D shows example translation tables 580 that may be used to facilitate localization, in accordance with some implementations. In this example, translation tables corresponding to the English and Japanese languages are shown. Any number of translation tables may be implemented to support assessing user responses in various languages.

Figure 6:
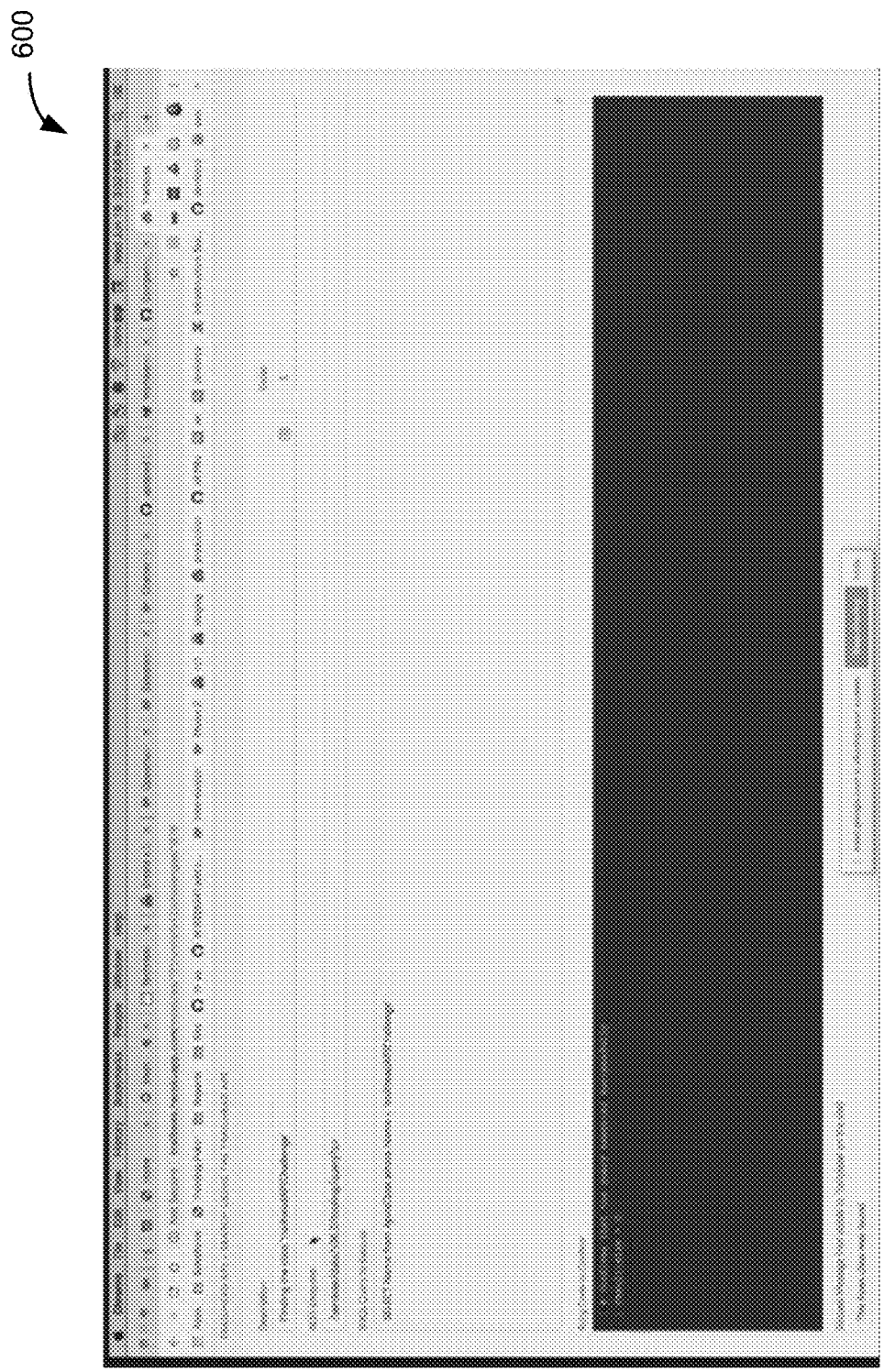
FIG. 6 shows an example of a GUI 600 presenting components for invoking an API, in accordance with some implementations.

In some implementations, a user may generate a check, plugin API or assessment definition using a declarative interface. FIG. 6 shows an example of a GUI 600 presenting components for invoking an API, in accordance with some implementations. The GUI may be provided for presentation via a display device, where the GUI is configurable to obtain user input that can be translated by the system into a module of an assessment definition (e.g., check API or plugin API) without human intervention. In this example, a user may provide a description, an API endpoint, and parameter(s). For example, the parameter of the API may include a query that is to be executed to obtain the user's response via the API. The system may then generate and store the API using the information the user has submitted. For example, the system may store a plugin API name in association with the description, API endpoint, and parameter(s).

An assessment definition may similarly be generated using a declarative interface. This enables a user to generate an assessment definition with minimal effort and without generating computer-readable code.

Figure 7:
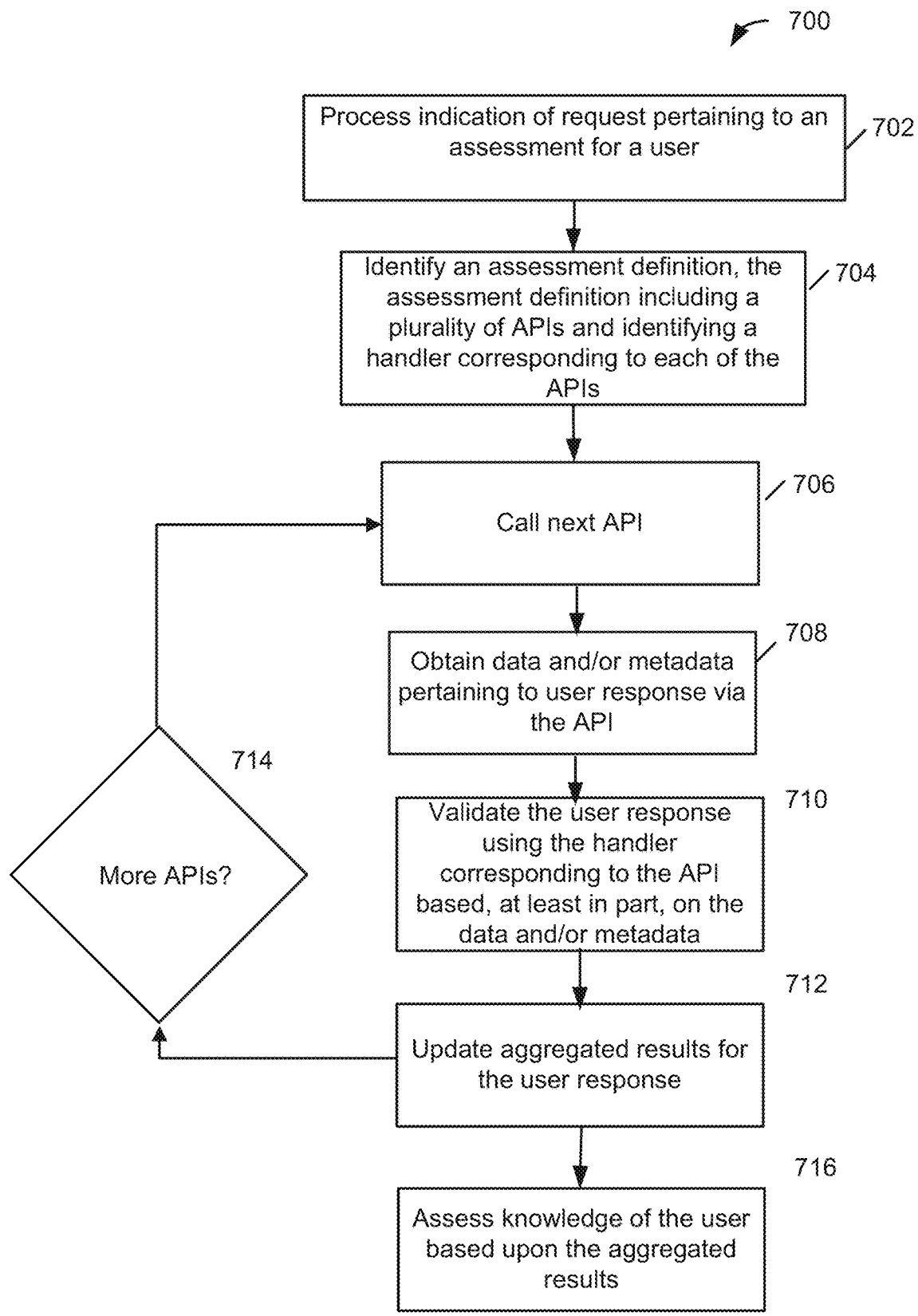
FIG. 7 shows an example of a method 700 for validating user responses to an assessment, in accordance with some implementations.

After a user has completed an assessment including one or more challenge tasks, the user's responses to the assessment may be validated using an assessment definition. FIG. 7 shows an example of a method 700 for validating user responses to an assessment, in accordance with some implementations. The system may process an indication of a request pertaining to an assessment for a user at 702. For example, the request may be received from a client device or another system component of Database System 102. The assessment may include a single challenge task or a sequence of challenge tasks. The system may identify at least one assessment definition for the assessment at 704, where the assessment definition includes one or more application programming interfaces (APIs) and identifies, for each of the APIs, a corresponding handler.

Each of the APIs may be configurable to obtain data and/or metadata pertaining to a user response to a corresponding challenge task. For example, an API may return data that includes a user response (or portion thereof) obtained from a database. As another example, the metadata may indicate that the user response could not be found. This may occur, for example, in situations where a user has skipped a challenge task or has responded to the challenge task incorrectly.

A user response may include user input submitted for a challenge task or an indication thereof. In some implementations, a user response includes information that is stored as a result of user input responsive to a corresponding challenge task. The information may include data and/or metadata. Each handler may be configurable to validate the user response using the data and/or metadata returned via the corresponding API. For example, where the API returns data, the handler may verify that the data represents the expected response for the corresponding task. As another example, where the API returns metadata that indicates that no records corresponding to the specified query could be found, the handler may ascertain that the user response to the challenge task is incorrect An assessment definition may identify a plugin corresponding to each API. Each plugin may obtain data and/or metadata pertaining to at least one user response from a corresponding computing system. A plugin may encapsulate the details of making the API call. An assessment definition may include one or more APIs. In some implementations, the assessment definition includes two or more APIs, where a first one of the APIs corresponds to a first plugin and a second one of the APIs corresponds to a second plugin. The first plugin may be configured to obtain at least one user response from a first computing system and the second plug may be configured to obtain at least one user response from a second computing system. For example, each plugin may be configured to obtain data and/or metadata pertaining to at least one user response. A computing system may be either internal or external to Database System 102. In some implementations, at least one of the APIs is a third party API that accesses a third party computing system that is external to Database System 102.

For each of the APIs identified in the assessment definition, the system may call the API at 706 and obtain data and/or metadata pertaining to a response of the user to the corresponding challenge task via the API at 708. In some instances, a challenge task may result in multiple responses to be verified. Data and/or metadata pertaining to each of these responses may be obtained via a corresponding API.

In some implementations, the API is configurable to obtain a response of the user (or associated data and/or metadata) from the corresponding computing system according to the locale of the user. Specifically, the system may ascertain a locale of the user, which may be used during runtime to modify information used to access the user response. The information may include parameter value(s) or rules/variables used to generate parameter values during runtime. For example, to query the computing system for a database record named "200 units" that the challenge task requested the user to create, the name of the database record "200 units" may be translated according to the user's locale prior to querying the system for the database record. As described above, this may be accomplished, during runtime, by replacing a variable of a parameter of the API with a value (e.g., string) that corresponds to the locale of the user. Specifically, the variable may be looked up in a translation table corresponding to the locale of the user to retrieve the string/value that corresponds to the locale of the user. This enables a single API or assessment definition to be used for any number of different locales.

The system may validate the user response using the handler corresponding to the API at 710. More particularly, the system may determine, using the handler corresponding to the API, whether the response of the user to the challenge task is correct. For example, the handler may determine whether the response is correct based, at least in part, on data and/or metadata returned by the API. For example, the handler may determine whether the system was able to retrieve a database record that the user was instructed to create. As another example, the handler may determine whether information in a retrieved database record is correct. The system may update the aggregated challenge task results based, at least in part, on a result of determining whether the response of the user to the challenge task is correct at 712. For example, the aggregated challenge task results may be updated to reflect that the user response to the corresponding challenge task is correct. The aggregated challenge task results may include a score or an indication of a pass/fail value.

In some implementations, the response of the user is validated using the handler by an external service. Specifically, the system may provide the handler and the user response (or associated data/metadata) to an external server that is external to the database system. This may be beneficial for security reasons. In addition, the external service may process a large number of handlers and corresponding user responses (or associated data/metadata), which removes the processing burden from Database System 102. Upon receiving an indication of whether the user response to the challenge task is correct from the external service, the system may process the indication and determine whether the response of the user to the challenge task is correct based, at least in part, on a result of processing the indication.

In some implementations, the handler returns a Boolean value indicating whether the response of the user is correct. The handler may also return a specific message, which may include an error message.

In some implementations, localization is performed to translate the message returned by the handler. For example, the message or portion thereof may be represented by a variable that is "translated" by looking up the variable in a translation table corresponding to the locale of the user. For example, a message indicating that the database record was not found could be provided in the user's native language. The message that is returned by the handler may be provided to the user or recorded in association with the user's assessment.

The process may continue at 714 for each of the remaining APIs (e.g., third party APIs) in the assessment definition to evaluate the user's remaining responses for the assessment. After all of the user's responses have been evaluated, the knowledge of the user may be assessed based, at least in part, on the aggregated challenge task results at 716.

After the user's responses to the assessment have been validated, the system may store an indication of the aggregated results in association with the assessment and the user. In addition, the system may provide an indication of whether the user has successfully completed the assessment for display by the user's device.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about a "group user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
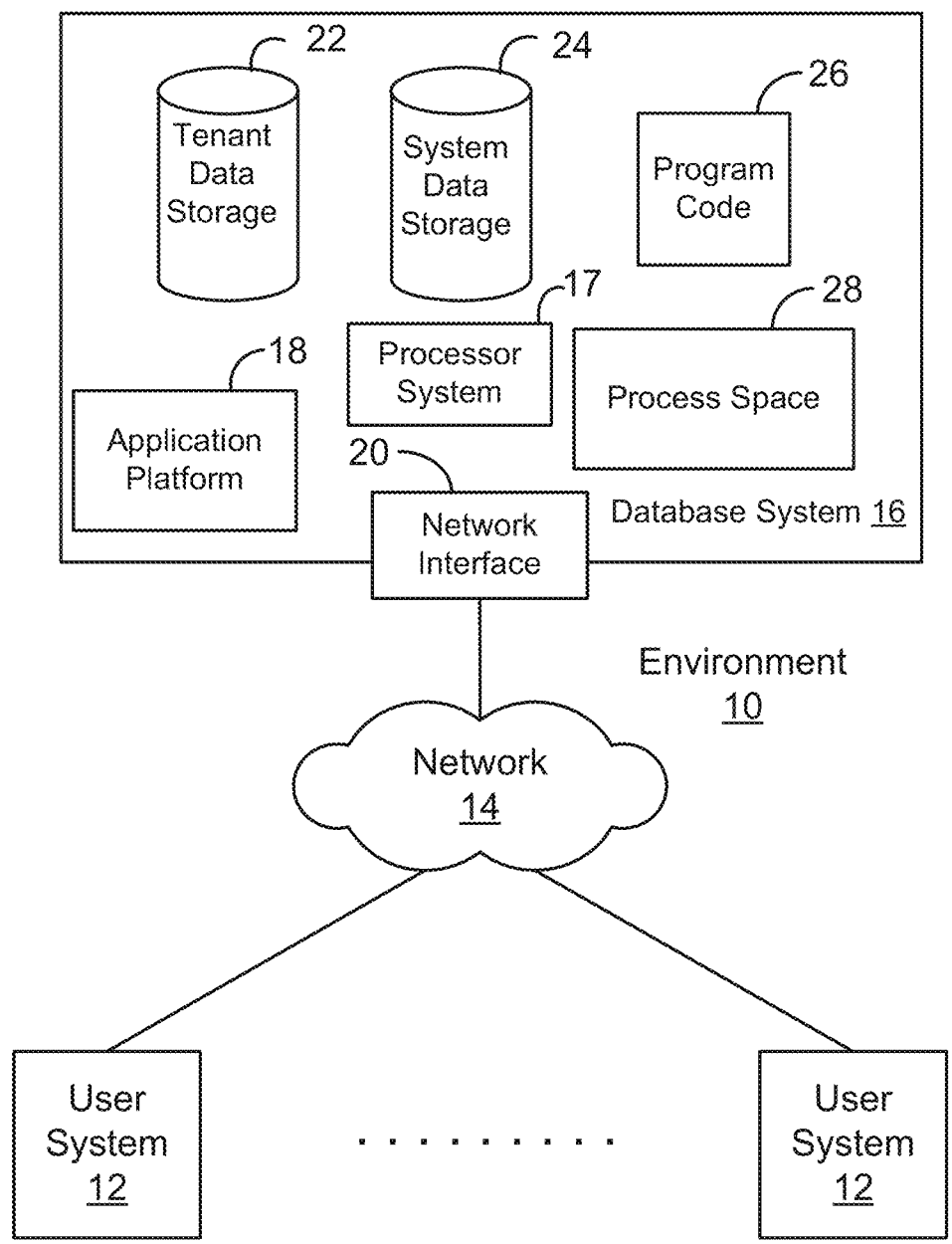
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
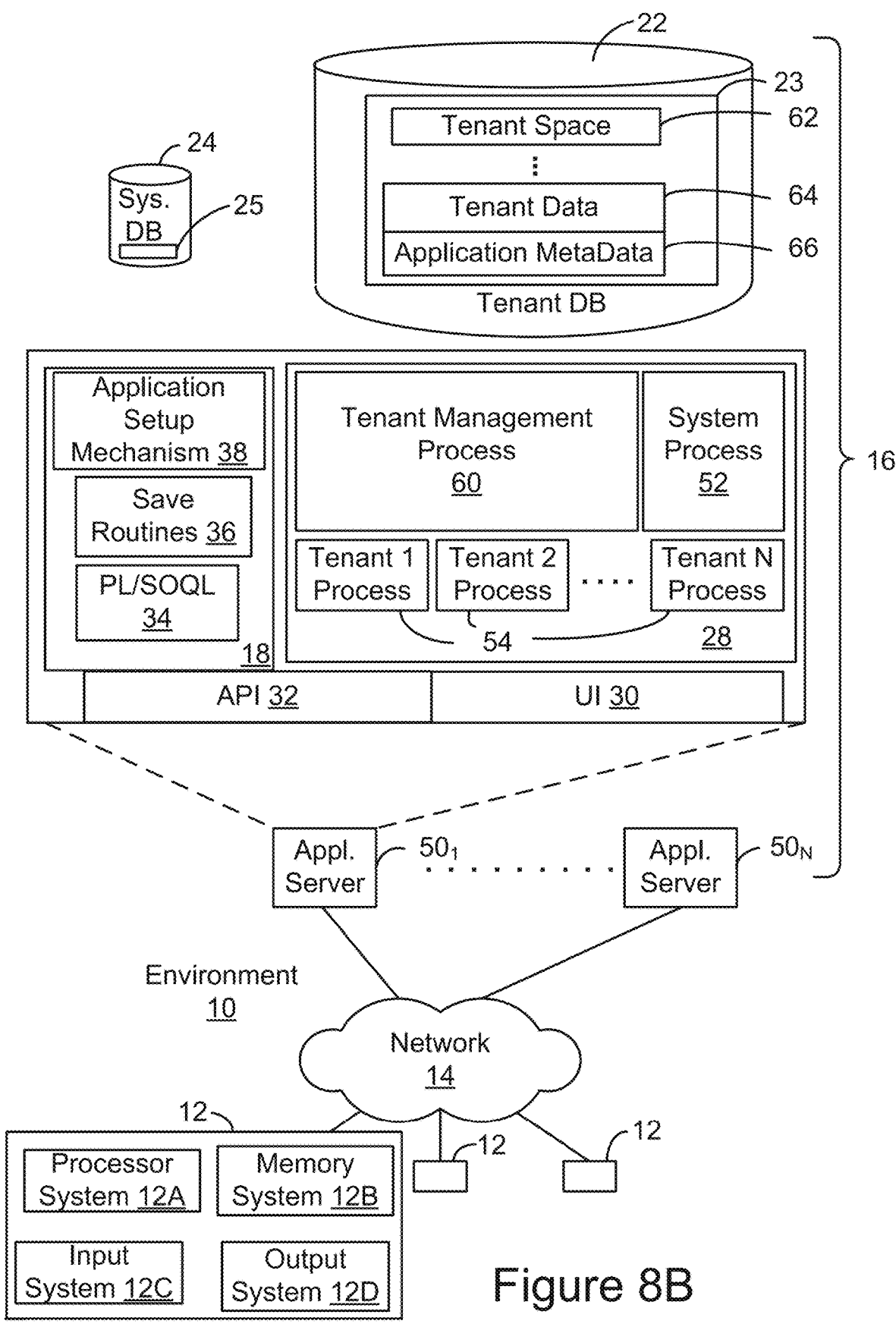
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
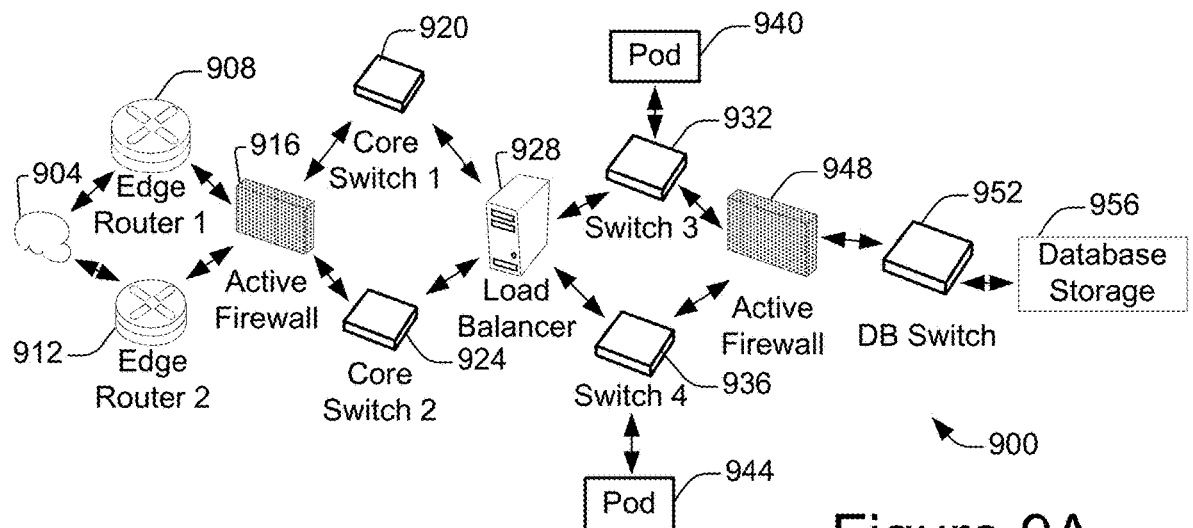
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
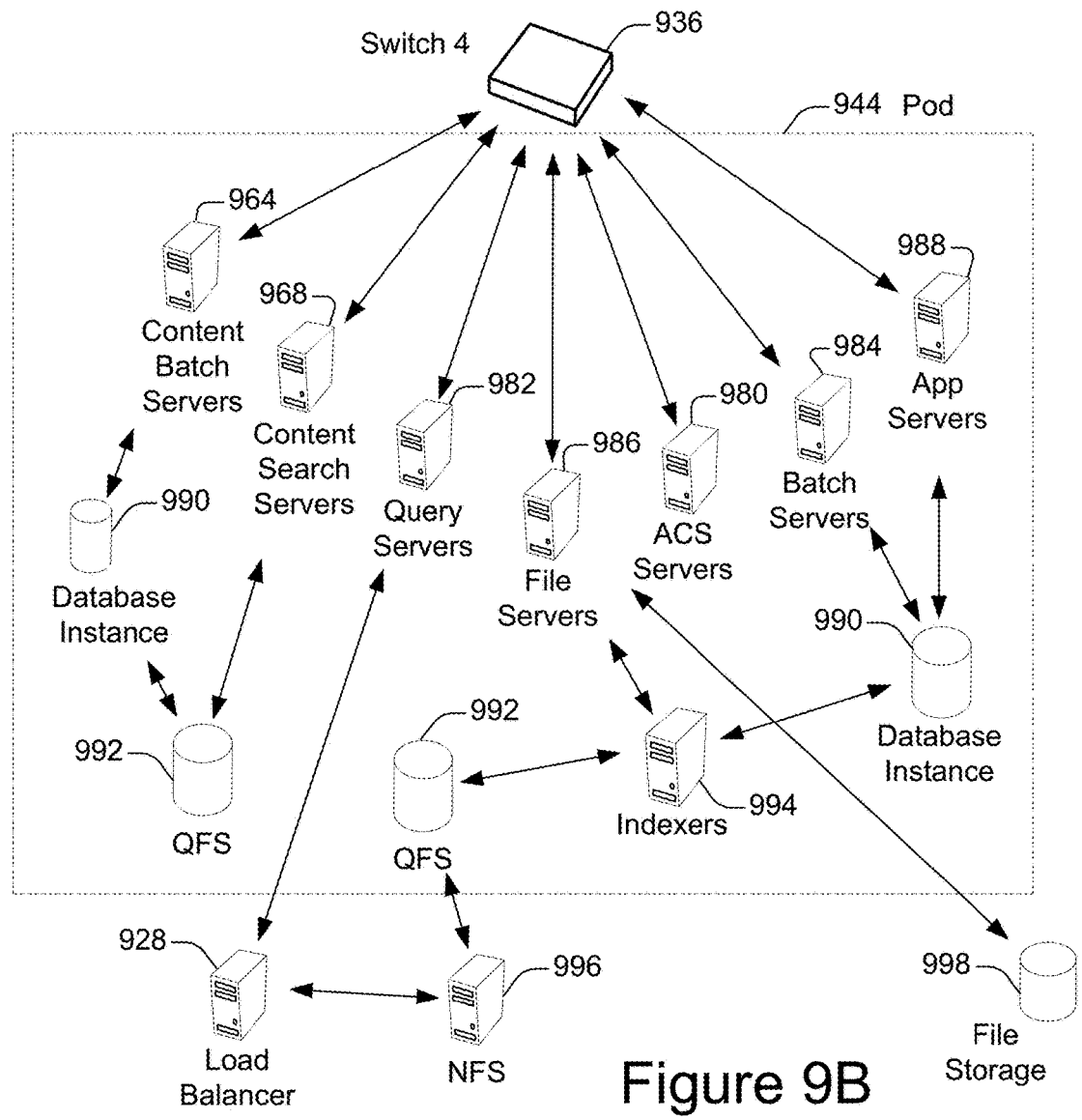
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
processing an indication of a request pertaining to an assessment for a user;
identifying an assessment definition for the assessment, the assessment definition including one or more application programming interfaces (APIs) and identifying, for each API, a corresponding plugin and handler, each handler configurable to validate responses of users using at least one of data or metadata returned via the corresponding API;
for each API in the assessment definition:
calling the API,
obtaining, via the API, at least one of data or metadata pertaining to a response of the user to a corresponding challenge task via the corresponding plugin,
providing the handler corresponding to the API and the user response to a service that is external to the database system,
processing an indication, received from the service, that the user response is correct,
determining, using the handler corresponding to the API and based at least in part on a result of processing the indication, that the at least one of the data or metadata indicates that the user response is correct, and
updating aggregated challenge task results based at least in part on a result of the determining that the at least one of the data or metadata indicates that the user response is correct; and
assessing knowledge of the user based at least in part on the aggregated challenge task results.

2. The system as recited in claim 1, the one or more APIs including a third party API, and the corresponding plugin being configured to obtain the at least one of the data or metadata from a computing system that is external to the database system.

3. The system as recited in claim 1, the assessment definition including two or more APIs, a first one of the APIs corresponding to a first plugin configured to obtain data or metadata pertaining to at least one user response from a first computing system and a second one of the APIs corresponding to a second plugin configured to obtain data or metadata pertaining to at least one user response from a second computing system different from the first computing system, at least one of the first computing system or second computing system being external to the database system.

4. The system as recited in claim 1, each API configured to query a corresponding computing system for the user response or a particular response requested from the user for the corresponding challenge task.

5. The system as recited in claim 1, the database system further configurable to cause:
ascertaining a locale of the user; and
replacing during runtime a variable of a parameter of an API in the assessment definition with a value that corresponds to the locale of the user.

6. The system as recited in claim 1, the database system further configurable to cause:
for an API, obtaining a response from the corresponding handler; and
translating, during runtime, the response or a portion thereof according to a locale of the user.

7. A method, comprising:
processing an indication of a request pertaining to an assessment for a user;
identifying an assessment definition for the assessment, the assessment definition including one or more application programming interfaces (APIs) and identifying, for each API, a corresponding plugin and handler, each handler configurable to validate responses of users using at least one of data or metadata returned via the corresponding API;
for each API in the assessment definition:
calling the API,
obtaining, via the API, at least one of data or metadata pertaining to a response of the user to a corresponding challenge task via the corresponding plugin, providing the handler corresponding to the API and the user response to a service that is external to a database system, processing an indication, received from the service, that the user response is correct, determining, using the handler corresponding to the API and based at least in part on a result of processing the indication, that the at least one of the data or metadata indicates that the user response is correct, and updating aggregated challenge task results based at least in part on a result of the determining that the at least one of the data or metadata indicates that the user response is correct; and assessing knowledge of the user based at least in part on the aggregated challenge task results.

8. The method as recited in claim 7, the one or more APIs including a third party API, and the corresponding plugin being configured to obtain the at least one of the data or metadata from a computing system that is external to the database system.

9. The method as recited in claim 7, the assessment definition including two or more APIs, a first one of the APIs corresponding to a first plugin configured to obtain data or metadata pertaining to at least one user response from a first computing system and a second one of the APIs corresponding to a second plugin configured to obtain data or metadata pertaining to at least one user response from a second computing system different from the first computing system, at least one of the first computing system or second computing system being external to the database system.

10. The method as recited in claim 7, each API configured to query a corresponding computing system for the user response or a particular response requested from the user for the corresponding challenge task.

11. The method as recited in claim 7, further comprising:
ascertaining a locale of the user; and
replacing during runtime, a variable of a parameter of an API in the assessment definition with a value that corresponds to the locale of the user.

12. The method as recited in claim 7, further comprising:
for an API, obtaining a response from the corresponding handler; and
translating, during runtime, the response or portion thereof according to a locale of the user.

13. A computer program product comprising a non-transitory computer-readable medium storing computer-readable program code capable of being executed by one or more processors, the program code comprising computer-readable instructions configurable to cause:
processing an indication of a request pertaining to an assessment for a user;
identifying an assessment definition for the assessment, the assessment definition including one or more application programming interfaces (APIs) and identifying, for each API, a corresponding plugin and handler, each handler configurable to validate responses of users using at least one of data or metadata returned via the corresponding API;

for each API in the assessment definition:
calling the API,
obtaining, via the API, at least one of data or metadata pertaining to a response of the user to a corresponding challenge task via the corresponding plugin,
providing the handler corresponding to the API and the user response to a service that is external to a database system,
processing an indication, received from the service, that the user response is correct,
determining, using the handler corresponding to the API and based at least in part on a result of processing the indication, that the at least one of the data or metadata indicates that the user response is correct, and
updating aggregated challenge task results based at least in part on a result of the determining that the at least one of the data or metadata indicates that the user response is correct; and
assessing knowledge of the user based at least in part on the aggregated challenge task results.

14. The computer program product as recited in claim 13, the one or more APIs including a third party API, and the corresponding plugin being configured to obtain the at least one of the data or metadata from a computing system that is external to the database system.

15. The computer program product as recited in claim 13, the assessment definition including two or more APIs, a first one of the APIs corresponding to a first plugin configured to obtain data or metadata pertaining to at least one user response from a first computing system and a second one of the APIs corresponding to a second plugin configured to obtain data or metadata pertaining to at least one user response from a second computing system different from the first computing system, at least one of the first computing system or second computing system being external to the database system.

16. The computer program product as recited in claim 13, each API configured to query a corresponding computing system for the user response or a particular response requested from the user for the corresponding challenge task.

17. The computer program product as recited in claim 13, the instructions further configurable to cause:
ascertaining a locale of the user; and
replacing during runtime a variable of a parameter of an API in the assessment definition with a value that corresponds to the locale of the user.

* * * * *